United States Patent [19]

Tabar et al.

[11] 4,269,746
[45] May 26, 1981

[54] COMPOUNDING POLYCHLOROPRENE RUBBER

[75] Inventors: Ronald J. Tabar, Amherst, Mass.; Paul C. Killgoar, Jr., Livonia, Mich.

[73] Assignee: Ford Motor Company, Dearborn, Mich.

[21] Appl. No.: 16,658

[22] Filed: Mar. 1, 1979

[51] Int. Cl.$^3$ .................... C08C 19/00; C08F 36/16
[52] U.S. Cl. ...................... 260/23.7 H; 260/23.7 M; 260/42.34
[58] Field of Search .......... 260/23.7 H, 42.34, 23.7 M

[56] References Cited

U.S. PATENT DOCUMENTS

| | | | |
|---|---|---|---|
| 2,544,746 | 7/1949 | Baum | 525/348 |
| 3,459,694 | 8/1969 | Bowman | 260/23.7 H |
| 4,138,537 | 2/1979 | Dembowski et al. | 260/42.34 |

FOREIGN PATENT DOCUMENTS

| | | | |
|---|---|---|---|
| 682877 | 3/1964 | Canada | 260/23.7 H |
| 687198 | 5/1964 | Canada | 260/42.34 |
| 1130476 | 4/1955 | France | |
| 2359172 | 7/1977 | France | |
| 2020293 | 5/1979 | United Kingdom | |

OTHER PUBLICATIONS

Murray et al., The Neoprenes, Dupont, Wilmington, Delaware, 1963, pp. 30, 41, 59, 60 and 61.
The Heat Stability of Vulcanized Elastomeric Compositions, Fetterman, Rubber Chemistry and Technology, vol. 46, 1973, pp. 927–937.
Dizon et al., Rubber Chemistry and Technology, vol. 47, 1974, pp. 231–249.
Wagner, Rubber Chemistry and Technology, vol. 49, 1976, pp. 703–774.
R. M. Murray and D. C. Thompson: "The Neoprenes", 1964, Published Dupont de Nemours, Wilmington, Del., U.S.A., pp. 74–75.

*Primary Examiner*—Ronald W. Griffin
*Attorney, Agent, or Firm*—Edmund C. Ross, Jr.; Olin B. Johnson

[57] ABSTRACT

Polychloroprene compounded with large particle, high structure carbon black and finely divided silica especially when combined with certain curants and plasticizer yields, upon curing, articles which exhibit high tear resistance and low compression set and are admirably suited for high temperature, fatigue producing applications as suspension bushings.

4 Claims, 4 Drawing Figures

COMPOUNDING POLYCHLOROPRENE RUBBER

BACKGROUND OF THE INVENTION

This invention relates to elastomeric compounds that exhibit an exceptional combination of temperature and fatigue resistance and includes, in particular, an elastomeric composition comprising mercaptan modified polychloroprene with specially selected particulate filler as well as preferably certain other ingredients, which upon cure, yields an article exhibiting advantageously both thermal dimensional stability, particularly evidenced by compression set, as well as high original and aged fatigue resistance along with other desirable properties making it admirably suited for use in preparation of automotive suspension components such as bushings.

Elastomeric componds are used in many dynamic, fatigue-producing applications, such as automotive suspension components. Conventionally cured (i.e., high sulfur) natural rubber compounds are usually employed in such applications because of their excellent fatigue properties despite their less desirable resistance to thermal and oxidative degradation. When thermal stability also becomes a component requirement, substitutes for these traditional materials may become necessary. In the case of suspension bushings, this requirement could arise as a result of increased engine compartment temperatures, or proximity to exhaust components.

Polychloroprene is an elastomer showing good potential for replacing natural rubber (NR) in high temperature dynamic applications. It is known to have better resistance to heat and oxidation than NR and has nearly the same resiliency. It might also be expected to have good fatigue properties since it crystallizes upon strain, and strain crystallization is known to improve fatique life. Moreover, it is not as expensive as other high temperature elastomers such as epichlorohydrin and polyacrylate.

Compounding polychloroprene to exhibit highly desirable properties including desirable original and aged fatigue as well as thermal stability evidenced by low compression set, however, is difficult. Typically, as compression set is desirably lowered through compounding, properties generally associated with fatigue resistance as tear strength tend to erode. On the other hand, as tear strength is desirably increased through compounding, properties associated with thermal stability as compression set tend to erode. For example, mercaptan modified polychloroprene compounds typically show low compression set but, also, low tear resistance using conventional thiourea cure with carbon black. Polychloroprene rubbers which are sulfur modified exhibit under similar compounding high tear resistance but, also, undesirably high compression set. Moreover, replacement of certain cyclic thioureas with alkyl substituted thioureas for cure, while providing lowered compression set, undesirably reduces tear resistance.

Thus, it would appear that one would normally be left with but a tradeoff between such important properties as compression set and tear resistance and, consequently, the discovery that both of these properties can be brought to quite desirable levels is of notable value.

Essential ingredients of compounds of this invention are advantageously commercially available and others have suggested their use in certain contexts. For example, silicas have been suggested for improving certain heat aged properties as compared to carbon black (see "Reinforcing Silicas and Silicates", Wagner, Rubber Chemistry and Technology; Vol. 49, 703, 1976 particularly 751, 766 and 767 and "Filler Effect on The Heat Stability of Vulcanized Elastomeric Compositions", Fetterman, Rubber Chemistry and Technology vol. 46, 927, 1973). Further, use of certain carbon blacks, e.g. large particle size and high structure has been reported as desirable in certain compositions for improvement in fatigue properties (see, Dizon et al, Rubber Chemistry and Technology, 47, 231 (1974). None of these disclosures, however, have shown a means to provide high tear strength along with low compression set in polychloroprene rubber compounds so as to make them especially suitable for high temperature, dynamic applications as automotive suspension bushings.

THE INVENTION

Figure 1:
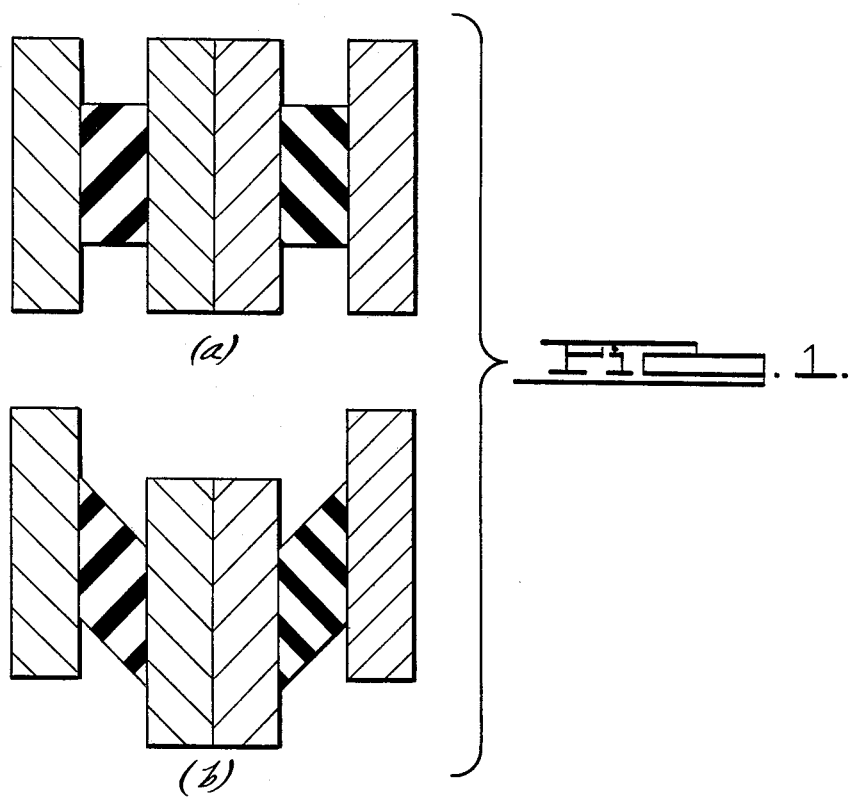
FIG. 1 illustration shear fatigue test samples used to test compounds of this invention.

Mercaptan modified polychloroprene rubber compounds, made with particulate filler comprising large particle, high structure carbon black and finely divided silica along with curant comprising preferably a sulfur donor as thiourea, more preferably a cyclic thiourea, and desirably low viscosity, low volatility plasticizer, especially when certain other ingredients are used, are easily processed and provide cured articles exhibiting highly desirable original and aged fatigue as well as, importantly, low compression set.

Through some as yet unexplained mechanism use of certain fillers enables preparation of mercaptan modified polychlorene compounds with both high tear resistance and low compression set. As fatigue resistance is associated with high tear resistance, polychloroprene compounds thus can be made not only with original dynamic properties comparable to natural rubber compounds, but also, with superior thermal resistance, especially in compression set. Moreover, these polychloroprene compounds exhibit strikingly better heat aged fatigue as compared to conventional natural rubber compounds used for suspension components as bushings.

DETAILED DESCRIPTION OF THE INVENTION

I. Ingredients for Rubber Compound

A. Polychloroprene Rubber

Polychloroprene rubbers in accordance with this invention include general purpose, extrudable, preferably a mercaptan modified polychloroprene are commercially available, e.g. Dupont Neoprene W, WRT. Other suitably employed polychloroprenes include Petrotex Neoprene M-1, Bayer Bayprene 210, 220 and Plastimere Butachlor MC-10. These polychloroprenes are polymers of 2-chloro-1, 3-butadiene that are solids with a specific gravity desirably between about 1.23 and 1.25 at 25/4° C. and especially suitable polychloroprene are those with medium Relative Mooney viscosity, e.g., in area of 50 ASTM D 1646, ML at 100° C., 2.5 minute reading. Blends of polychloroprenes may be used.

B. Particulate Filler

1. Carbon Black—Essential to this invention is selection of carbon black that not only is large particle, but, furthermore of high structure. These carbon blacks are commercially available. Typical ASTM designations for such large particle, high structure carbon blacks are N-650, N-539, N-568, N-351 and N-660 available blacks include, for example, United N-568 available from Ashland, Huber 550 available from Huber, Continex 6PF-HS from Continental, and Furnex 756 from Columbian. A preferred carbon black is N-765.

These large particles have relatively low measured surface area per gram in a range, for example, up to about 90 square meters per gram, preferably less than about 70, as below about 60 square meters per gram, and a high oil absorption as DBP (dibutylpthalate) Absorption (cc per 100 grams) in a range above about 60, more preferably 75, as, for example, greater than about 90.

2. A wide variety of finely divided silicas including both hydrated and dehydrated silicas are suitable for this invention and also commercially available. These silicas have a surface area of up to about 400, preferably up to 300 square meters per gram, more preferably in a range up to about 50-250 square meters per gram. Further, the silicas for use herein are desirably in a size range of 1-75 ASTM nanometers, preferably about 10-50 nanometers, examples of such silicas including Cab-O-Sils, Hi-Sils and Tokusils. In one embodiment, the silica may comprise up to about 50 phr.

It is the combination of these carbon and silica particulate fillers that has critical effect for obtaining both desirable tear resistance and compression set and consequent desirable suspension component compounding material. The combination can be used at up to about 200 parts per hundred parts by weight polychloroprene (phr) depending upon amount of type of processing aids, more preferably up to about 100 phr and desirably at least about 10 phr as for example, 15-60 phr, depending upon processing aids and the like.

C. Curants

A wide variety of curants are available for use with polychloroprene rubbers and any of these conventional curants, e.g. sulfur systems, peroxide systems should not normally alter the advantage of the particulate fillers combination described above.

Sulfur donor systems especially sulfur donor systems as thiourea accelerator containing curants are especially suitable, however, for desired properties and are preferred.

Desirably included in preferred curants comprising thioureas are inhibitors as thiophthalamides such as cyclohexylthiophthalamides, metal oxide as zinc oxide, magnesium oxide, lead oxide, antioxidant and cure stabilizers.

Preferred among sulfur donor curants are, as mentioned, thioureas and particularly substituted thioureas, as, for example, by methyl, ethyl, etc. (e.g, trimethyl thiourea, 1,3 diethyl thiourea 1,3 dibutyl thiourea) especially cyclic thioureas (e.g. 2-mercaptomidazaline more commonly known as ethylene thiourea). Preferred thioureas as ethylene thiourea may be used at, for example, about 0.2-2 phr, but for both tear and compression set advantage about 0.4-0.9.

D. Plasticizer

Polychloroprene rubbers are known to harden during aging and it is desirable therefore to include plasticizers into the compound to mitigate this phenomenum, especially low volatility plasticizers. High viscosity oils, however, are less desirable as they may undesirably reduce the resilience of the polychloroprene compounds. Normally, then highly desirable plasticizers are chosen from low volatility, low viscosity oils and oils are rapeseed oil which additionally exhibit desirable solubility parameters with polychlorprene rubber. Other plasticizers may be used in combination with these preferred low volatility, low viscosity oils. Still other desirable plasticizers include dioctyl sebacate, Shell-flex 310 and other such oils that exhibit losses of below about 10% by weight at 150° C. in 24 hours and especially those which have viscosities of below about 500, more preferably 100 cP (measured by Brookfield Viscometer) at 22° C.

The plasticizer including low viscosity, low volatility oil may be used in any suitably conventional processing amount but is normally employed at levels below about 30 phr as, for example, about 1-15 phr.

II. Processing

The mercaptan modified polychloroprene compounds of this invention may be compounded in standard rubber compounding equipment e.g., banbury, two roll mixers, using conventional techniques. Molding operations include also use of standard equipment as rubber extrusion or other such molding equipment. The cure of polychloroprene compounds can be made desirably reversionless and together with use of cure inhibitors permits ready processing in accordance with this invention.

III. Applications

The polychloroprene compounds of this invention may have wide use for high temperature, dynamic applications and are particularly suitable for automotive suspension components as engine mounts and the like. Of special consideration is the desirable low compression set and heat aged fatigue properties making them especially useful for automotive suspension bushings exposed to high temperature. For example, compounds of this invention may be utilized to meet easily compression set at well below usual 50% after 22 hours at 150° C. while maintaining excellent fatigue resistance after aging.

EXAMPLE

Polychloroprene (CR) compounds are mixed in a Banbury mixer (model BR) using a five minute, upside-down mixing schedule. The curing agents are added on a cooled 200×400 mm two-roll mill. Cure properties are determined on an oscillating disk rheometer. The CR materials are molded to 100% optimum cure at either 160° or 170° C. The 100% cure is easily applied to the CR compounds without overcure because of their reversion resistance.

Sample sheets (150×150×2 mm) are molded according to ASTM D 3182 and compression set buttons (28 mm diameter and 13 mm thickness) are molded according to ASTM D 395. Tear test samples are cut from the sheets using a die and punch press. Using a two-bladed fly cutter on a drill press, ring samples for fatigue testing are also cut from the sheets. The ring samples are approximately 26 mm i.d. and 0.7 mm wall thickness.

Shear test samples, FIG. 1, are constructed using the compression set buttons. The elastomer was ultrasonically cleaned in a Freon TMC solvent and bonded to sand-blasted steel disks with Chemlok 205 primer and Chemlok 234 B adhesive (Hughson Chemicals). A bond cure of 90 minutes at 130° C. under a 15% compressive strain on the rubber is followed by a water quench.

Test Methods

Tear

Tear properties are determined according to ASTM D 624 (die B) at ambient temperature and a test rate of 500 mm per minute on an electromechanical tester.

Compression set

Testing is performed according to ASTM D 395 (Method B), the test conditions being 22 hours at either 125° or 150° C. under 25% compression. The samples are either the molded buttons or disks cut out with a one-bladed fly cutter from sheets and plied to a thickness approximately equal to that of the molded buttons.

Fatigue testing

Figure 3:
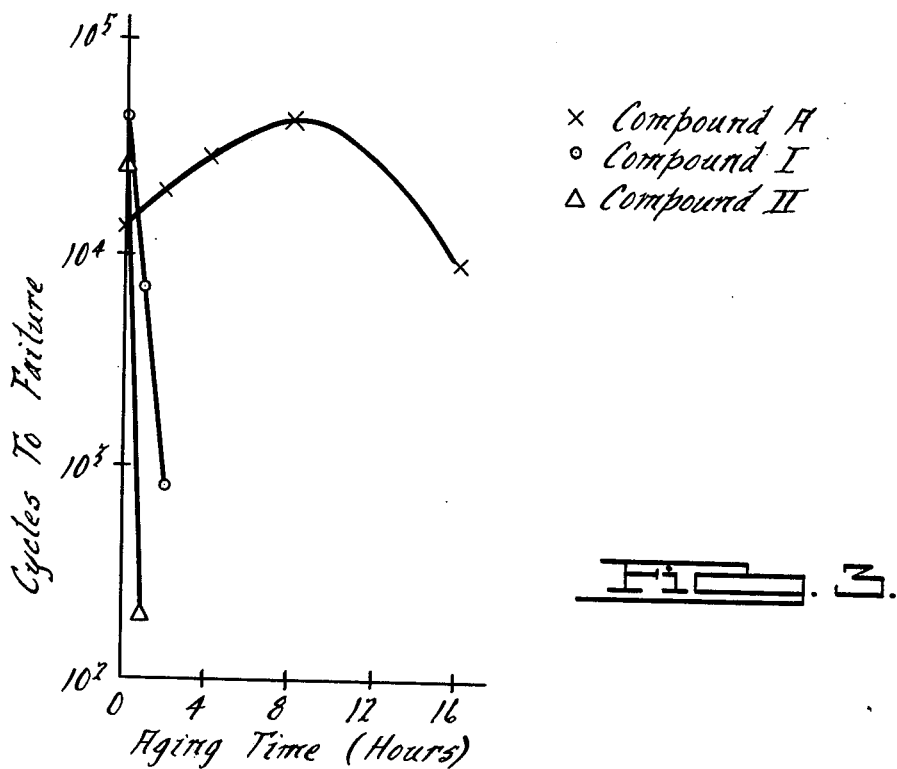
FIG. 3 illustrates original and heat aged fatigue properties for compounds of this invention and certain natural rubber compounds.

Fatigue measurements are made on an Instron 1350 or a Pegasus servo-hydraulic tester in tension using ring specimens and in shear using bonded rubber cylinders (FIG. 1). In shear the test is run between 0 and 100% shear strain at 3 Hz. Failure is defined as the cycle at which the maximum load has decayed to 50% of its value at 100 cycles. The baseline of 100 cycles is chosen to minimize the effects of normal stress softening on the results. In tension the rings are tested on glycerin lubricated spindles at 2 or 3 Hz. The rings are cycled at constant strain to failure. Tensile fatigue is done on both an aged (shown as U.A. in Table III) and aged specimens (FIG. 3). The aging of the rings is performed in a vented, air-circulating oven.

Dynamic properties

Dynamic testing is done in compression using the compression set buttons on the Instron servo-hydraulic test machine. The elastomer is preloaded to 30% compressive strain between parallel plates covered with 150 grit sandpaper. A 10 Hz sine wave is superimposed upon the preload. The amplitude of the test signal is ±1% strain. Test temperatures are varied from 20°–150° C. (±0.5° C.) using an environmental chamber on the tester; the buttons are soaked ½ hour at the test temperature before testing.

The CR compounds prepared appear in Table I with ingredient identification in Table II and results of testing in Table III.

TABLE I

| | R-1287 | R-1288 | R-1289 | R-1313 | R-1229 | R-1242 | R-1243 | R-1244 | R-1246 | R-1266 |
|---|---|---|---|---|---|---|---|---|---|---|
| NEOPRENE W | 100 | 100 | 100 | 100 | | | | | | |
| NEOPRENE WRT | | | | | 100 | | | | | |
| NEOPRENE GRT | | | | | | 100 | 100 | 100 | 100 | |
| NEOPRENE GNA | | | | | | | | | | |
| NEOPRENE NPX-3769 | | | | | | | | | | 100 |
| SRF-HM (N-774) | 50 | | | | | 25 | 25 | 0.6 | 25 | 20 |
| SRF (N-770) | | | | | | | | 24.4 | | |
| SRF-HS (N-765) | | | | 42 | | | | | | |
| HAF (N-330) | | 34 | | | | | | | | |
| ISAF (N-220) | | | 32 | | | | | | | |
| FEF (N-550) | | | | | 25 | 25 | 25 | | 25 | 20 |
| MT (N-590) | | | | | 60 | | | | | |
| Hi Sil 233 | | | | | | | | | | |
| CABOSIL MS7 | | | | | | | | | | |
| MAGLITE D BAR | 4 | 4 | 4 | 4 | 4 | 4 | 4 | 4 | 4 | 4 |
| AGERITE STALITE S | 3 | 3 | 3 | 3 | 4 | 3 | 3 | 3 | 3 | 3 |
| SILANE A-1893 | | | | | | | | | | |
| STEARIC ACID | | | | | 0.5 | 1 | 1 | 1 | 1 | |
| VANFRE-AP-2 | | | | | | | | | | 1 |
| TE-28-G8 | 1 | 1 | 1 | 1 | | | | | | |
| RAPESEED OIL | | | | | 15 | | | | | |
| DOS | | | | | | 10 | 10 | 10 | 10 | |
| NA-22 | 0.7 | 0.7 | 0.7 | 0.7 | 1 | | | | | |
| THIATE B | | | | | | 0.25 | 0.5 | | 0.5 | |
| THIATE E | | | | | | | | 0.5 | | 0.5 |
| NA-101 | | | | | | | | | | |
| TMTD | | | | | | | | | | |
| PVI | | | | | | | | | | |
| ZnO | 5 | 5 | 5 | 5 | 10 | 5 | 5 | 5 | 5 | 5 |

| | R-1267 | R-1240 | R-1285 | R-1286 | R-1291 | 1293 | R-1247 | R-1251 | R-1232 | R-1248 |
|---|---|---|---|---|---|---|---|---|---|---|
| NEOPRENE W | | | 100 | 100 | 100 | 100 | 100 | 100 | | 100 |
| NEOPRENE WRT | | | | | | | | | | |
| NEOPRENE GRT | | | | | | | | | 100 | |
| NEOPRENE GNA | | 100 | | | | | | | | |
| NEOPRENE NPX-3769 | 100 | | | | | | | | | |
| SRF-HM (N-774) | 20 | 25 | 10 | 10 | 25 | 50 | 35 | 25 | | 35 |
| SRF (N-770) | | | | | | | | | 25 | |
| SRF-HS (N-765) | | | | | | | | | | |
| HAF (N-330) | | | | | | | | | | |
| ISAF (N-220) | | | | | | | | | | |
| FEF (N-550) | 20 | 25 | | | | | | | 25 | |
| MT (N-590) | | | | | | | | | | |
| Hi Sil 233 | | | | | 23 | | | | | |
| CABOSIL MS7 | 25 | 25 | | | | | | 25 | | |
| MAGLITE D BAR | 4 | 4 | 4 | 4 | 4 | 4 | 4 | 4 | 4 | 4 |
| ACERITE STALITE S | 3 | 3 | 3 | 3 | 3 | 3 | 3 | 3 | 3 | 3 |
| SILANE A-1893 | | | 1 | | | | | | | |
| STEARIC ACID | | 1 | | | | | | | 1 | 3 |
| VANFRE-AP-2 | 1 | | 1 | 1 | 1 | 1 | 1 | 1 | | 1 |
| TE-28-G8 | | | | | | | | | | |
| RAPESEED OIL | | | | | | | | | | |
| DOS | | 10 | | | | | | | 10 | |
| NA-22 | | 0.5 | 0.7 | 0.7 | 0.7 | 0.7 | 0.7 | 0.7 | 0.5 | 0.5 |

TABLE I-continued

| | | | | | | | | | | |
|---|---|---|---|---|---|---|---|---|---|---|
| THIATE B | | | | | | | | | 1.0 | |
| THIATE E | 0.5 | | | | | | | | | |
| NA-101 | | | | | | | | | | |
| TMTD | 0.5 | | | | | | | | | |
| PVI | | | | | | | | | | |
| ZnO | 5 | 5 | 5 | 5 | 5 | 5 | 5 | 5 | 5 | 5 |

| | | R-1253 | R-1268 | R-1273 | R-1264 | R-1346 | R-1358 |
|---|---|---|---|---|---|---|---|
| | NEOPRENE W | 100 | 100 | 100 | 100 | 100 | 100 |
| | NEOPRENE WRT | | | | | | |
| | NEOPRENE GRT | | | | | | |
| | NEOPRENE GNA | | | | | | |
| | NEOPRNE NPX-3769 | | | | | | |
| | SRF-HM (N-774) | 25 | 20 | 20 | 12 | | |
| | SRF (N-770) | | | | | | |
| | SRF-HS (N-765) | | | | | 25 | 25 |
| | HAF (N-330) | | | | | | |
| | ISAF (N-220) | | | | | | |
| | FEF (N-550) | | | | | | |
| | MT (N-590) | | | | | | |
| | Hi Sil 233 | | | | | | |
| | CABOSIL MS7 | 25 | 30 | 30 | 45 | 25 | 25 |
| | MAGLITE D BAR | 4 | 4 | 4 | 4 | 4 | 4 |
| | AGERITE STALITE S | 3 | 3 | 3 | 3 | 3 | 3 |
| | SILANE A-1893 | | | | | | |
| | STEARIC ACID | | | | | | |
| | VANFRE-AP-2 | 1 | 1 | 1 | 1 | | |
| | TE-28-G8 | | | | | | |
| | RAPESEED OIL | | | | | 2 | 2 |
| | DOS | | | | | | |
| | NA-22 | | 0.7 | 1.2 | 0.7 | 0.7 | 0.7 |
| | THIATE B | | | | | | |
| | THIATE E | 1 | | | | | |
| | NA-101 | | | | | | |
| | TMTD | | | | | | |
| | PVI | | | | | | 0.5 |
| | ZnO | 5 | 5 | 5 | 5 | 5 | 5 |

TABLE II

| | |
|---|---|
| Hi Sil 233 | PPG INDUSTRIES PRECIP. HYDRATED |
| CABOSIL MS 7 | CABOT CORPORATION FUMED |
| MAGLITE D BAR | MgO (OIL STABILIZED) |
| AGERITE STALITE S | VANDERBILT MIXTURE OF OCTYLATED DIPHENYL AMINES |
| SILANE A-1893 | UNION CARBIDE - MERCAPTO ETHYL TRIETHOXY SILANE |
| STEARIC ACID | STEARIC ACID |
| VANFRE-AP-2 | VANDERBILT MIXTURE OF PROCESSING LUBRICANTS |
| TE-28-G8 | TECHNICAL PROCESSING, OIL PROCESSING AID |
| RAPESEED OIL | RAPESEED OIL |
| DOS | DIOCTYL SEBBACATE |
| NA-22 | DUPONT - ETHYLENE THIOUREA |
| NA-101 | DUPONT - TETRAMETHYL THIOUREA |
| THIATE B | VANDERBILT - DIMETHYL ETHYL THIOUREA |
| THIATE E | VANDERBILT - TRIMETHYL THIOUREA |
| PVI | MONSANTO - CYCLOHEXYLTHIOPTHALIMIDE |
| ZnO | ZnO |
| TMTD | VANDERBILT (METHYL TUADS) - TETRA METHYL THIURAM DISULFIDE |

TABLE III

| COMPOUND NO. | ORIGINAL TENSILE (MPa) | H.A. TENSILE 16 HRS @150 | H.A. TENSILE 25 HRS @150 | H.A. TENSILE 2 HRS @150 | ORIGINAL TEAR (kN/M) | H.A. TEAR 16 HRS @150 | H.A. TEAR 24 HRS @150 |
|---|---|---|---|---|---|---|---|
| R-1287 | 22 | 21 | | | 25 | 27 | |
| R-1288 | 23 | 24 | | | 24 | 25 | |
| R-1289 | 26 | 23 | | | 24 | 35 | |
| R-1313 | 23 | | 15 | | 40 | | 32 |
| R-1229 | 16 | | | 16 | 28 | | |
| R-1242 | 18 | | | 18 | 36 | | |
| R-1243 | 19 | | | 18 | 36 | | |
| R-1244 | 18 | | | 19 | 36 | | |
| R-1246 | 18 | | | 18 | 38 | | |
| R-1266 | 21 | | | 22 | 46 | | |
| R-1267 | 20 | | | 21 | 48 | | |
| R-1240 | 19 | | | 18 | 55 | | |
| R-1285 | 25 | | | 27 | 41 | | |
| R-1286 | 26 | | | 26 | 53 | | |
| R-1291 | 22 | | 16 | | 50 | | 65 |
| R-1293 | 23 | 21 | 19 | | 40 | 39 | |
| R-1247 | 21 | | | 20 | 32 | | |

TABLE III-continued

| | | | | |
|---|---|---|---|---|
| R-1251 | 21 | | 20 | 66 |
| R-1232 | 20 | | 20 | 44 |
| R-1248 | 19 | | 19 | 25 |
| R-1253 | 24 | | 23 | 54 |
| R-1268 | 23 | | 25 | 82 |
| R-1273 | 22 | | 23 | 66 |
| R-1264 | 22 | | | 99 |
| R-1346 | 20 | 12 | | 56 | 39 |
| R-1358 | 21 | 16 | | 67 | 59 |

| COMPOUND NO. | H.A. TEAR 2 HRS @150 | COMPRESSION SET % | FATIGUE (CYCLES) | (UNAGED U.A.) |
|---|---|---|---|---|
| R-1287 | | 16 | 4200 | |
| R-1288 | | 20 | 20000 | |
| R-1289 | | 19 | 15000 | |
| R-1313 | | 16 | 7500 | |
| R-1229 | 31 | 21 | | |
| R-1242 | 38 | 50 | | |
| R-1243 | 36 | 54 | | |
| R-1244 | 37 | 53 | | |
| R-1246 | 40 | 61 | | |
| R-1266 | 49 | 58 | | |
| R-1267 | 49 | 59 | | |
| R-1240 | 54 | 81 | | |
| R-1285 | 48 | 28 | | |
| R-1286 | 50 | 31 | | |
| R-1291 | | 31 | | |
| R-1293 | | 20 | | |
| R-1247 | 41 | 19 | 5700 | |
| R-1251 | 71 | 35 | 36000 | |
| R-1232 | 42 | 75 | | |
| R-1248 | 31 | 14 | | |
| R-1253 | 58 | 31 | | |
| R-1268 | 85 | 47 | 68000 | |
| R-1273 | 67 | 42 | | |
| R-1264 | | 68 | | |
| R-1346 | | 24 | | |
| R-1358 | | 29 | 85000 Shear | 8000 Rings |

Comparative Testing

In this testing, a mercaptan modified chloroprene (CR) compound (Compound A) with ingredients listed below and two standard natural rubber (NR) compounds are compared with respect to certain properties. The NR compounds may be considered comparable to such compounds used commercially in similar applications as those for the CR compounds. The NR materials are molded and cured to 95% optimum cure at 150° C. The 95% cure is used to optimize the physical properties of the NR materials while avoiding overcure. The CR compounding is as described above.

Compound A

| Ingredient | Parts by Weight |
|---|---|
| Neoprene W | 100 |
| N-765 black | 25 |
| Silica | 25 |
| Maglite D bar | 4 |
| Agerite Stalite S | 3 |
| Rapeseed oil | 2 |
| Zinc oxide | 5 |
| NA-22 | 0.8 |
| Santogard PVI | 0.5 |
| | 165.3 |

Thermal aging resistance

Figure 2:
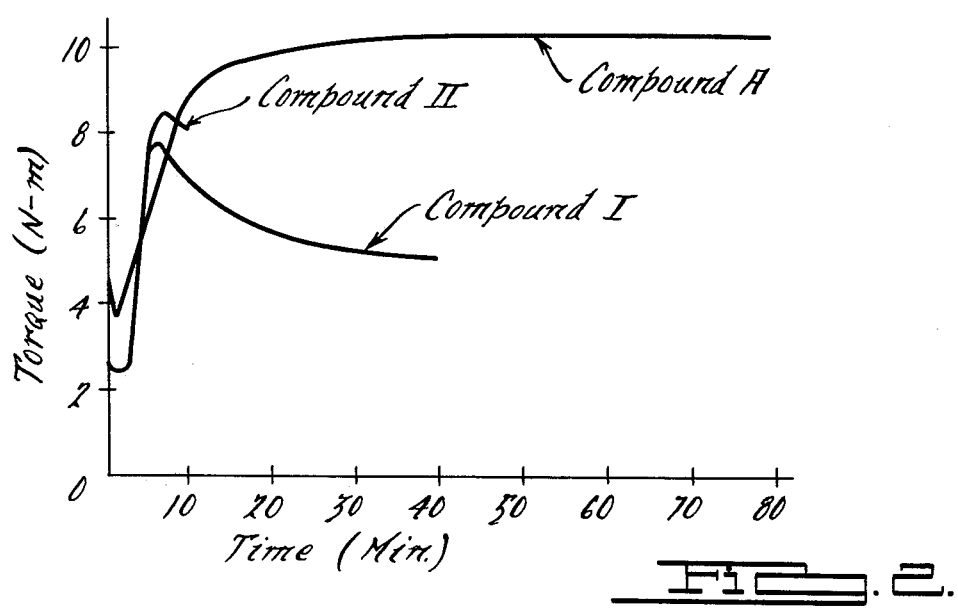
FIG. 2 illustrates a rheometer curve for compounds of this invention and certain natural rubber compounds.

An oscillating disk rheometer is used to demonstrate thermal stability since it measures the high temperature shear modulus of a material as a function of aging time in the near absence of air. Rheometer curves for two baseline materials (Compounds I and II) and Compound A are shown in FIG. 2. Once the CR compound cures (reaches maximum torque after passing through a minimum) there is no further change in the modulus (torque). The NR materials quickly undergo reversion (loss of modulus with time) after reaching a maximum. The rheometer curves thus demonstrate that Compound A has greater resistance to thermal degradation than the NR materials.

Compression set

Compression set is an important property for automotive suspension bushings. Resistance to compression set often parallels thermal resistance since it measures the change a material undergoes during exposure to an elevated temperature. Although air is present during the exposure, the bulk of the sample is protected due to the slow diffusion of oxygen through the rubber. Table IV shows that Compound A is clearly superior in resistance to compression set, having about half of the compression set of the baseline materials.

TABLE IV

| Compression Set Tests | | |
|---|---|---|
| Compound | Test Temperature | |
| | 125° C. | 150° C. |
| Compound I | 51%[a] | |
| Compound II | 39%[a] | 78%[b] |
| Compound A | 21%[a] | 29%[a], 36%[b] |

[a] molded buttons tested
[b] plied disks tested

Fatigue properties

Comparison of CR and NR materials in traditional shear fatigue tests is difficult. The bonding properties of the compounds to steel play a significant role in these tests. The CR materials all bond well and therefore the shear fatigue results reflected their cut growth resistance. Inconsistent adhesive strength with the NR materials produce inconsistent shear fatigue results because sample failure could be due to either elastomer or adhesive failure. A tensile fatigue test using rings is developed to avoid the complications caused by adhesive failure.

The tensile fatigue test is designed to compare materials of different moduli (which might result from aging) by testing them at equal energies. The rings are cycled through a constant strain, the strain of each test being chosen such that the input energy density in the initial cycles is approximately 1.3 mJ/mm$^3$, as measured from the stress-strain curves. A 65 durometer material might be tested in cycles of 0–100% strain while a 50 durometer material in cycles of 0–150% strain. Materials are compared at equal energy rather than equal strain since in service the elastomer would be deformed by a fixed energy input, the deflection being dependent on the material's modulus. If materials of differing moduli are tested at equal strains in preference to equal energy, the apparent fatique life of the hard materials would be lowered relative to the soft materials since the strain energy would be greater.

Tensile fatigue test results on the two NR materials and Compound A as a function of aging time at 150° C. are shown in FIG. 3. The original NR materials are superior in fatigue, but this superiority is short-lived under the aging conditions. Compound A has a longer fatigue life after less than one hour at 150° C. Compound A is expected to have far better fatigue life than the NR materials when aging at high temperatures is involved.

Figure 4:
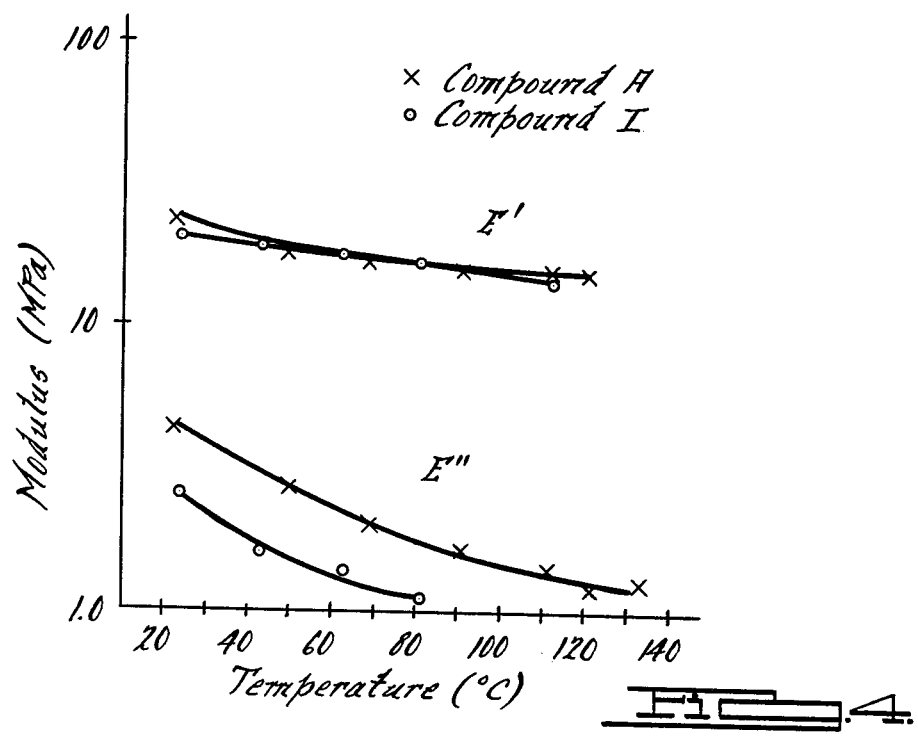
FIG. 4 illustrates dynamic properties for compounds of this invention and certain natural rubber compounds.

Dynamic properties of Compound A and Compound I are compared in FIG. 4. As mentioned, the levels of the ingredients used in Compound A were chosen such that the modulus would be similar to production materials. Therefore, the elastic moduli (E') of the two materials are the same at room temperature but also are similar over the entire temperature range tested. Compound A, however, is more damping than Compound I.

What is claimed is:

1. A rubber compound for an automotive suspension bushing that resists tear and has compression set below 50% after 22 hours at 150° C., said rubber compound consisting essentially of:
   (A) 100 parts by weight mercaptan modified chloroprene rubber;
   (B) particulate filler which consists essentially of about 10–200 parts by weight of:
      1. high structure, large particle carbon black; and
      2. finely divided silica;
   (C) sulfur current comprising a sulfur donor;
   (D) about 1–30 parts by weight of a low volatility, low viscosity plasticizer that exhibits loss of below about 10% by weight at 150° C. in 24 hours and viscosity below about 500 cP at 22° C.

2. The compound in accordance with claim 1, wherein the finely divided silica comprises up to about 50 phr.

3. The compound in accordance with claim 1, wherein the sulfur curant comprises a thiourea.

4. The compound in accordance with claims 1 or 2 or 3, wherein the sulfur donor comprises a cyclic thiourea.

* * * * *